US012735556B2

(12) United States Patent
Iftime et al.

(10) Patent No.: US 12,735,556 B2
(45) Date of Patent: Sep. 15, 2026

(54) FABRICATION OF BENZOXAZINE FUNCTIONALIZED PARTICLES

(71) Applicant: PALO ALTO RESEARCH CENTER INCORPORATED, Palo Alto, CA (US)

(72) Inventors: Gabriel Iftime, Newark, CA (US); Junhua Wei, Palo Alto, CA (US); Mahati Chintapalli, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 1092 days.

(21) Appl. No.: 17/854,261

(22) Filed: Jun. 30, 2022

(65) Prior Publication Data

US 2023/0069939 A1 Mar. 9, 2023

Related U.S. Application Data

(60) Provisional application No. 63/241,698, filed on Sep. 8, 2021.

(51) Int. Cl.

| | |
|---|---|
| ***C08K 9/04*** | (2006.01) |
| ***C04B 14/32*** | (2006.01) |
| ***C08K 3/14*** | (2006.01) |
| *B33Y 10/00* | (2015.01) |
| *B33Y 70/10* | (2020.01) |

(52) U.S. Cl.

CPC .............. *C08K 9/04* (2013.01); *C04B 14/324* (2013.01); *C08K 3/14* (2013.01); *B33Y 10/00* (2014.12); *B33Y 70/10* (2020.01)

(58) Field of Classification Search

CPC ........ C08K 3/14; C08K 9/04; C08G 73/1053; C04B 14/324; C04B 35/628; C04B 35/62886; B33Y 10/00; B33Y 70/10

See application file for complete search history.

(56) References Cited

U.S. PATENT DOCUMENTS

2013/0267659 A1* 10/2013 Ward ....................... C08J 5/249 524/611
2022/0315493 A1 10/2022 Wei et al.

FOREIGN PATENT DOCUMENTS

EP 4 067 322 A2 10/2022

OTHER PUBLICATIONS

Kim et al. to "Synthesis and thermal characterization of polybenzoxazines based on acetylene-functional monomers" Polymer 40 (1999) 6565-6573 (Year: 1999).*

(Continued)

*Primary Examiner* — Shuangyi Abu Ali
(74) *Attorney, Agent, or Firm* — Miller Nash LLP

(57) ABSTRACT

A method includes adding particles to an alkaline solution, stirring the solution to cause the particles to acquire hydroxyl groups producing activated particles, dispersing the activated particles into a solvent solution, adding acetylene benzoxazine into the solvent solution, mixing the solvent solution, removing the solvent from the solvent solution to produce acetylene-benzoxazine functionalized particles, and drying the acetylene-benzoxazine functionalized particles. A composition of matter has acetylene-benzoxazine functionalized particles dispersed in a resin.

15 Claims, 5 Drawing Sheets

(56) References Cited

OTHER PUBLICATIONS

Tarek Agag, Tsutomu Takeichi, Synthesis and characterization of benzoxazine resin-SiO2 hybrids by sol-gel process: The role of benzoxazine-functional silane coupling agent, Polymer 52 (2011) 2757-2763.

Chuan-Shao Wu, Ting-Hsuan Kao, Hsieh-Yu Li, Ying-Ling Liu, Preparation of polybenzoxazine-functionalized Fe3O4 nanoparticles through in situ Diels-Alder polymerization for high performance magnetic polybenzoxazine/Fe3O4 hanocomposites, Composites Science and Technology 72 (2012) 1562-1567.

B. Kiskan, A. L. Demirel, O. Kamer, Y. Yagci, Synthesis and Characterization of Nanomagnetite Thermosets Based on Benzoxazines, Journal of Polymer Science: Part A: Polymer Chemistry, 6708 (2008).

K.S. S. Kumar and C.P. R. Nair, Ch 3 Polybenzoxazine—new generation phenolics, Handbook of Thermoset Plastics. DOI: http://dx.doi.org/10.1016/B978-1-4557-3107-7.00003-8 (2014).

S. Alekseev, E. Shamatulskaya, M. Volvach, S. Gryn, D. Korytko, I. Bezverkhyy, V. Iablokov, V. Lysenko, Size and Surface Chemistry Tuning of Silicon Carbide Nanoparticles, Langmuir 2017, 33, 13561-13571.

L.R. Jefferies et al., Alcohols as electrophiles: iron-catalyzed Ritter reaction and alcohol addition to alkynes. Tetrahedron, 2014. 70(27): p. 4204-4207.

Sharma et al., "Integration with benzoxazine to improve particle dispersion and thermal performance of composites," Colloids and Surfaces A, 32 (2020) 124515.

Biru et al., "Genzoxazine-functionalized graphene oxide for synthesis of new nanocomposites," European Polymer Journal, 83 (2016) 244-255.

Yan et al., "Study of Surface-Functionalized Nano-SiO2/Polybenzoxazine Composites," J. Applied Polymer Science, 120 (2011) 1525-1532.

* cited by examiner

FABRICATION OF BENZOXAZINE FUNCTIONALIZED PARTICLES

RELATED APPLICATION

This application claims priority to and the benefit of U.S. Provisional Application No. 63/241,698 filed Sep. 8, 2021, which is incorporated herein by reference in its entirety.

TECHNICAL FIELD

This disclosure relates to functionalization of particles used in ceramic matrix composites, more particularly to functionalization of particles with benzoxazine.

BACKGROUND

Several applications will benefit from using high temperature and corrosion resistance materials, including storage systems for high temperature thermal energy storage, solar receivers for concentrated solar power plants, solar reactor, nuclear reactor, chemical synthesis process, or internal combustion engines. Ceramic matrix composites (CMC) particularly Silicon Carbide (SiC) CMCs can meet these requirements. However, fabrication of high ceramic yield SiC CMCs with less than 10% voids, as required for effective performance is challenging. The first reason is that polymer carriers generally decompose at the temperatures required for the pyrolysis step during CMC manufacturing. Benzoxazines, particularly those incorporating acetylene groups are known to have high char yields (up to 70%). Incorporation of SiC nanoparticle fillers can significantly decrease voids and increase the overall char yield to >90%, but this require high SiC nanoparticle loading, which is not possible with existing bare SiC nanoparticles. Particle agglomeration results in large voids content, which limits the performance of these CMCs.

In addition, other applications involving rapid heat removal from hot sources, such as lithium-ion batteries in electric vehicles, require polymer composites with high thermal conductivity which can in principle, be provided as particle filled polymer composites. The particle aggregation issue also prevents fabrication of high loading formulations. SiC in particular is preferred due to its intrinsic relatively high thermal conductivity (~21 W/m·K).

Several methods for fabrication of functionalized particles with benzoxazine groups have been previously disclosed. One method functionalizes silicon dioxide particles with benzoxazine through a sol gel process using a benzoxazine functionalized with a silane coupling agent [Tarek Agag, Tsutomu Takeichi, Synthesis and characterization of benzoxazine resin-$SiO_2$ hybrids by sol-gel process: The role of benzoxazine-functional silane coupling agent, Polymer 52 (2011) 2757-2763]. Another method fabricates benzoxazine functionalized $Fe_3O_4$ nanoparticles through a Diels-Alder process [Chuan-Shao Wu, Ting-Hsuan Kao, Hsieh-Yu Li, Ying-Ling Liu, Preparation of polybenzoxazine-functionalized Fe3O4 nanoparticles through in situ Diels-Alder polymerization for high performance magnetic polybenzoxazine/$Fe_3O_4$ nanocomposites, Composites Science and Technology 72 (2012) 1562-1567]. Another method achieves functionalized magnetite particles by reacting magnetite particles with a carboxylic acid functionalized benzoxazine [B. Kiskan, A. L. Demirel, O. Kamer, Y. Yagci, Synthesis and Characterization of Nanomagnetite Thermosets Based on Benzoxazines, Journal of Polymer Science: Part A: Polymer Chemistry, 6708 (2008)]. However, none of these discloses functionalization of nanoparticles with acetylene functionalized benzoxazine. Among all types of benzoxazines, only acetylene-containing benzoxazine achieve a high char yield of greater than 70%. Other benzoxazines achieve 50% at best [K. S. S. Kumar and C. P. R. Nair, Ch 3 Polybenzoxazine-new generation phenolics, Handbook of Thermoset Plastics. DOI: http://dx.doi.org/10.1016/B978-1-4557-3107-7.00003-8 (2014)]. In addition, the current art does not disclose fabrication of benzoxazine functionalized SiC nanoparticles, with any kind of benzoxazine.

A method for fabrication of polymer benzoxazine formulations incorporating large amounts of homogeneously dispersed SiC would solve these challenges. A method for fabrication of benzoxazine functionalized SiC nanoparticles has not been reported in the current art.

SUMMARY

According to aspects illustrated here, there is provided a method that includes adding particles to an alkaline solution, stirring the solution to cause the particles to acquire hydroxyl groups producing activated particles, dispersing the activated particles into a solvent solution, adding acetylene benzoxazine into the solvent solution, mixing the solvent solution, removing the solvent from the solvent solution to produce acetylene-benzoxazine functionalized particles, and drying the acetylene-benzoxazine functionalized particles.

According to aspects illustrated here, there is provided a composition of matter has acetylene-benzoxazine functionalized particles dispersed in a resin.

BRIEF DESCRIPTION OF THE DRAWINGS

FIG. 4 shows examples of acetylene-benzoxazines suitable for the embodiments.

FIG. 5 shows an example of an allyl-containing benzoxazine suitable for use as a resin in the embodiments.

FIG. 6 shows an example of a furan-containing benzoxazine suitable for use as a resin in the embodiments.

DETAILED DESCRIPTION OF THE EMBODIMENTS

Figure 1:
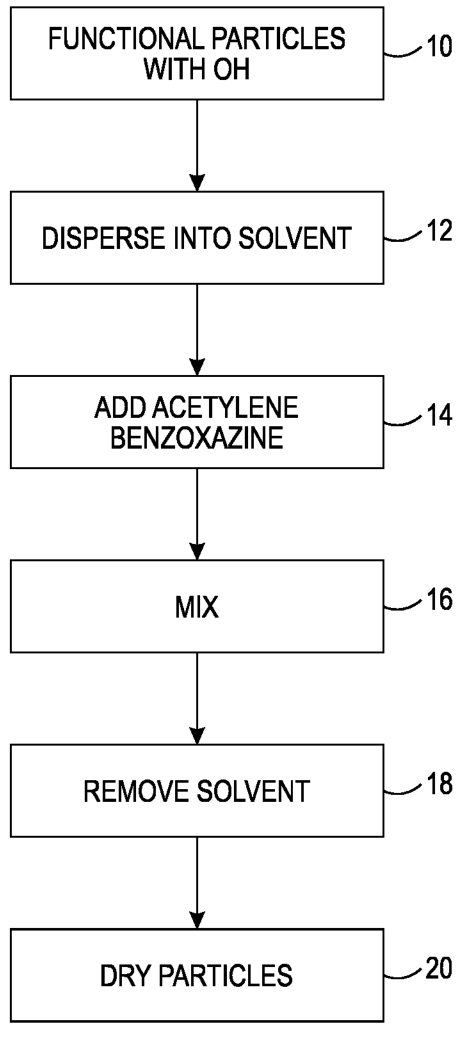
FIGS. 1 and 2 show alternative embodiments of a method of fabrication of benzoxazine functionalized particles.

The embodiments here involve a method of fabrication of benzoxazine functionalized particles by reacting hydroxyl activated particles with an acetylene-containing benzoxazine. The embodiments also include a method for fabrication of acetylene-benzoxazine functionalized SiC particles and nanoparticles. The embodiments here also include composite formulations comprising acetylene-functionalized nanoparticles dispersed in a benzoxazine resin. In one embodiment, the benzoxazine resin is an acetylene-functionalized benzoxazine. In another embodiment, it is a furan-functionalized benzoxazine. In still another embodiment, it is a vinyl-functionalized benzoxazine such as propargyl-benzoxazine. The embodiments may include an object made of the composite formulation above, and ceramic made by pyrolyzing the object.

Many inorganic particles already have hydroxyl (OH) groups onto their surface. Examples of such particles include $SiO_2$, $Al_2O_3$, $Fe_3O_4$, $TiO_2$, and others. SiC particles, on the other hand, have no OH groups or have only very small amount, which prevents them from reacting with the acetylene group from the benzoxazine molecule. The method for fabrication of functionalized SiC nanoparticles requires a first step to introduce OH groups onto their surface. One suitable process [S. Alekseev, E. Shamatulskaya, M. Volvach, S. Gryn, D. Korytko, I. Bezverkhyy, V. Iablokov, V. Lysenko, Size and Surface Chemistry Tuning of Silicon Carbide Nanoparticles, Langmuir 2017, 33, 13561-13571] consists in first, thermal oxidation of the SiC nanoparticle surface to produce an oxide layer onto the surface of these particles. The process comprises annealing in air with a heating ramp with a temperature comprising a range from 0.1° C./min to 100° C./min, and kept for a desired time comprising a range from 1 min to 24 hours, at a temperature comprising a range from 300° C. to about 1000° C. In the second step, the oxide layer is hydrolyzed to form hydroxide group by stirring the oxide surface functionalized particles in an alkaline solution, followed by drying in air. The alkaline solution may comprise KOH, NaOH, CsOH dissolved in water in a concentration from about 0.1 M to 20 M. The particles are washed with water and dried. Using steam, plain water or any water containing solution or spray or any form instead of alkaline solution can also hydrolyze the oxide layer to hydroxide group.

The next step comprises a chemical reaction of the OH groups onto the surface of the particles with acetylene-benzoxazine. A process for a coupling reaction of organic alcohols with acetylenes has been described in solution previously, as in [L. R. Jefferies et al., Alcohols as electrophiles: iron-catalyzed Ritter reaction and alcohol addition to alkynes. Tetrahedron, 2014. 70(27): p. 4204-4207].

Unlike these references, the embodiments here provide particle functionalization, instead of organic molecules coupling, development of a process suitable for acetylene-benzoxazine, and a process for fabrication of benzoxazine functionalized SiC.

In one embodiment, acetylene-benzoxazine functionalized particles dispersed in acetylene-benzoxazine are fabricated in a one-step process. This is advantageous because it eliminates the need to separate and purify particles, then remixing them with benzoxazine monomer. Acetylene-benzoxazine precursors are advantageous because they produce high yield char upon pyrolysis. The process has been disclosed in U.S. patent application Ser. No. 17/582,901, filed Jan. 24, 2022, which is incorporated by reference herein in its entirety.

In a more general embodiment, shown in FIG. 1 the particles are functionalized at 10 typically by stirring in an alkaline solution to cause the particles to acquire a hydroxyl (OH) group. The OH functionalized particles are then dispersed into a solvent at 12. Acetylene benzoxazine is added at 14, possibly with a catalyst and then mixed. The mixture is stirred at 16, possibly under reflux for a period of time sufficient to maximize the functionalization. The particles are separated from solvent and washed at 18, then dried at 20.

Figure 2:
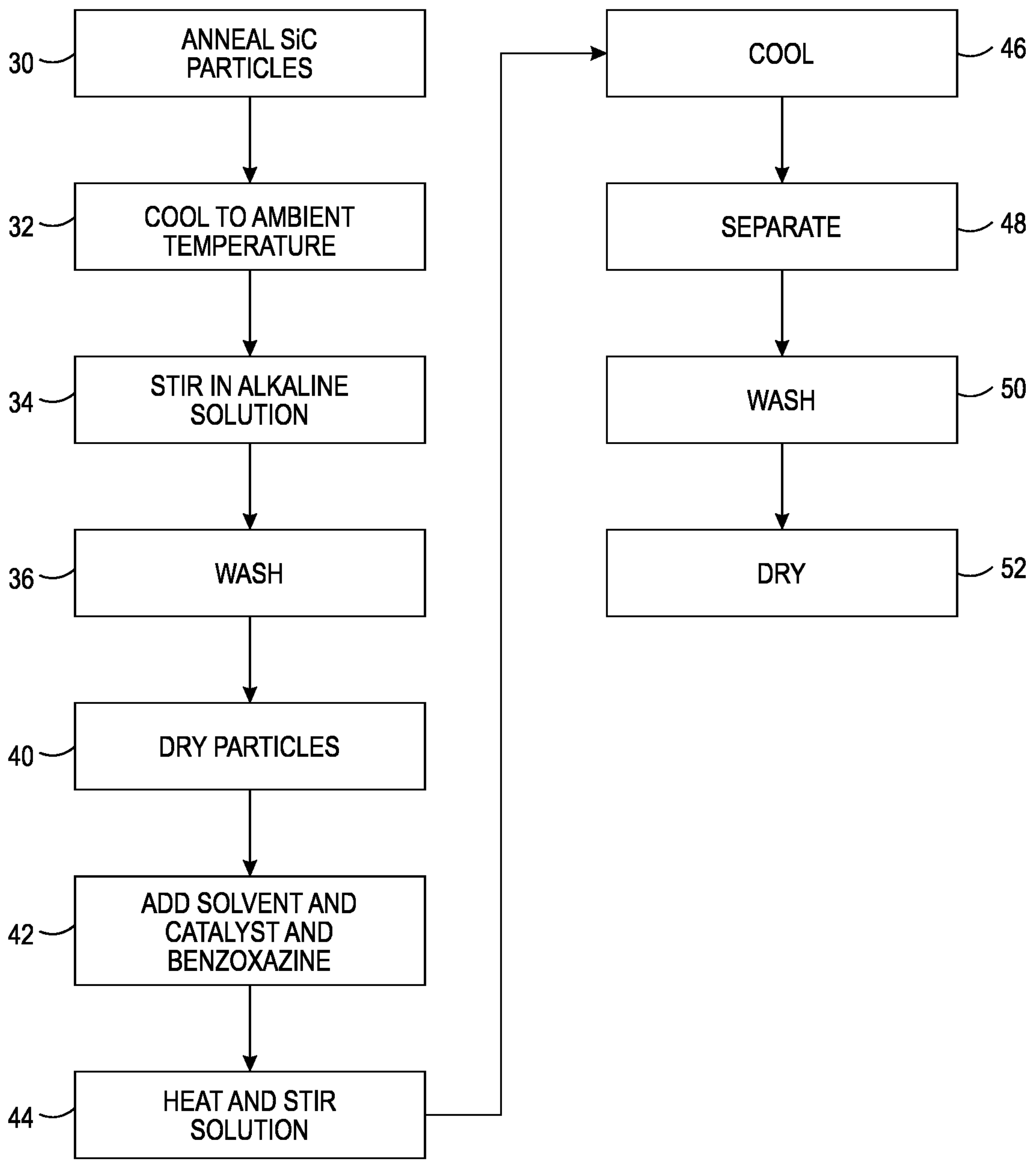

A more specific embodiment is shown in FIG. 2. The particles are functionalized with an acetylene-benzoxazine monomer, purified and then are dispersed in a solvent and a benzoxazine monomer. This may involve annealing the SiC particles at 30. The annealed particles are cooled at 32. The cooled particle are stirred in an alkaline solution at 34, then are washed with water at 36 and then dried at 40, to produce particles activated with OH groups (SiC—OH). The particles may then be dispersed with stirring into a solvent, then a catalyst at 42. The catalyst may comprise a Lewis acid or a mixture of more than one Lewis acid is added and stirred to solubilize the Lewis acid in the solvent. Acetylene benzoxazine is then added. The benzoxazine then dissolves while the solution undergoes stirring, and the mixture is heated above the boiling point of the solvent to achieve a solvent reflux at 44. The mixture is stirred under reflux for a period of time sufficient to maximize the functionalization. After cooling down at 46, the particles are separated from solvent by centrifugation or by filtration at 48. The particles are washed with a solvent to recover the unreacted or the excess of acetylene-benzoxazine, further washed with water to remove the inorganic products at 50 and dried at 52.

The attachment of the acetylene-benzoxazine takes place by chemical coupling that produces a ketone group. The process may require a Lewis acid catalyst, such as ferric chloride ($FeCl_3$) or ferric chloride/silver hexafluoroantimonate ($FeCl_3/AgSbF_6$). Other Lewis acid catalysts may also catalyze the particle functionalization reaction including ferric fluoride ($FeF_3$), ferric bromide ($FeBr_3$), aluminum chloride ($AlCl_3$), boron fluoride ($BF_3$), boron bromide (($BBr_3$), tin tetrachloride ($SnCl_4$), tin (IV) fluoride ($SnF_4$), phosphorous pentafluoride ($PF_5$), phosphorous pentachloride ($PCl_5$), zinc chloride ($ZnCl_2$), beryllium chloride ($BeCl_2$), silicon tetrafluoride ($SiF_4$), silicon tetrachloride ($SiCl_4$), antimony pentachloride ($SbCl_5$), and niobium pentachloride ($NbCl_5$). In some embodiments, the Lewis acids may be hydrated, such as $FeCl_3x(H_2O)_6$ and $ZnCl_2xH_2O$. In other embodiments, Lewis acids can act in synergy with salts of superacids. Example of suitable salts of superacids include antimony halide salts: $AgSbF_6$; $NaSbF_6$; $Cu(SbF_6)_2$; and $NH_4SbF_6$; triflates: $NaO_3SCF_3$; $AgO_3SCF_3$; $Yb(O_3SCF_3)_3$; fluorosulfonic acid salts: $NaSO_3F$; $LiSO_3F$; $Be(SO_3F)_2$; $NH_4SO_3F$; $N(CH_3)_4SO_3F$; and $Al(SO_3F)_3$; chlorosulfonic acid salts: $NaSO_3Cl$; $LiSO_3Cl$; $Be(SO_3Cl)_2$; $NH_4SO_3Cl$; $N(CH_3)_4SO_3Cl$; and $Al(SO_3Cl)_3$; and carborane acid salts: $Na(CHB_{11}X_{11})$; $Li(CHB_{11}X_{11})$; and $Cs(CHB_{11}X_{11})$ wherein X is a halogen such as Cl and F. As an example a system containing a mixture of $FeCl_3x(H_2O)_6$+$AgSbF_6$ may be more efficient than the $FeCl_3x(H2O)_6$ alone.

Suitable solvents include dichloromethane, chloroform, 1,1-dichloroethane, 1,2-dichloroethane, trichloro ethane, tetrahydrofuran, dioxane, ethylene glycol ethers such as dimethyl and ethyl glycol ethers and higher molecular weight ether of other diols such as diethylene or triethylene glycol. Higher boiling solvents may be beneficial for accelerating the reaction rate, therefore decreasing the reaction time. Reaction time may differ for different solvents, can be in a range from 1 hour to 24 hours or more. The reaction temperature may comprise a range from 40° C. to 250° C.

Figure 3:
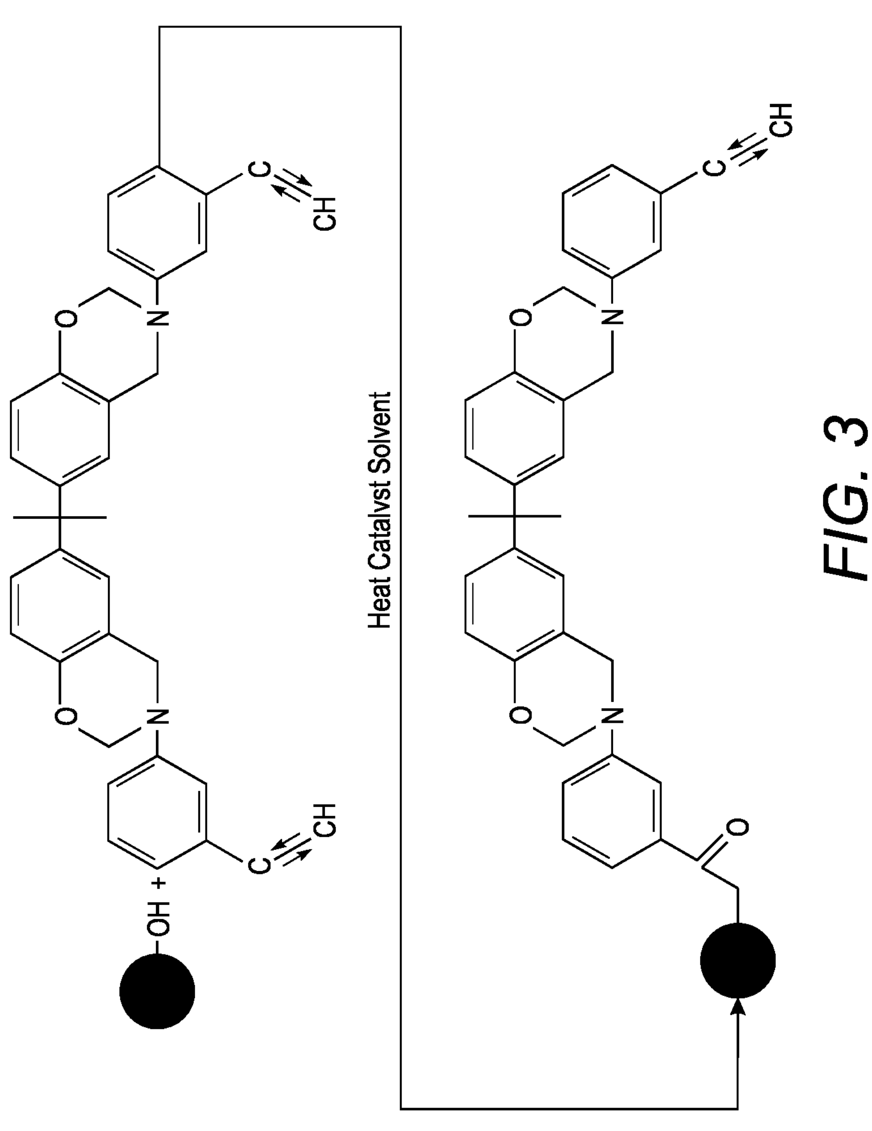
FIG. 3 shows a diagram of an embodiment of a process of particle functionalization with acetylene-benzoxazine.

FIG. 3 shows an embodiment of the chemical functionalization process. Chemical reaction of the OH-functionalized particle on the left side results in a particle being functionalized with acetylene-benzoxazine on the right.

Figure 4:
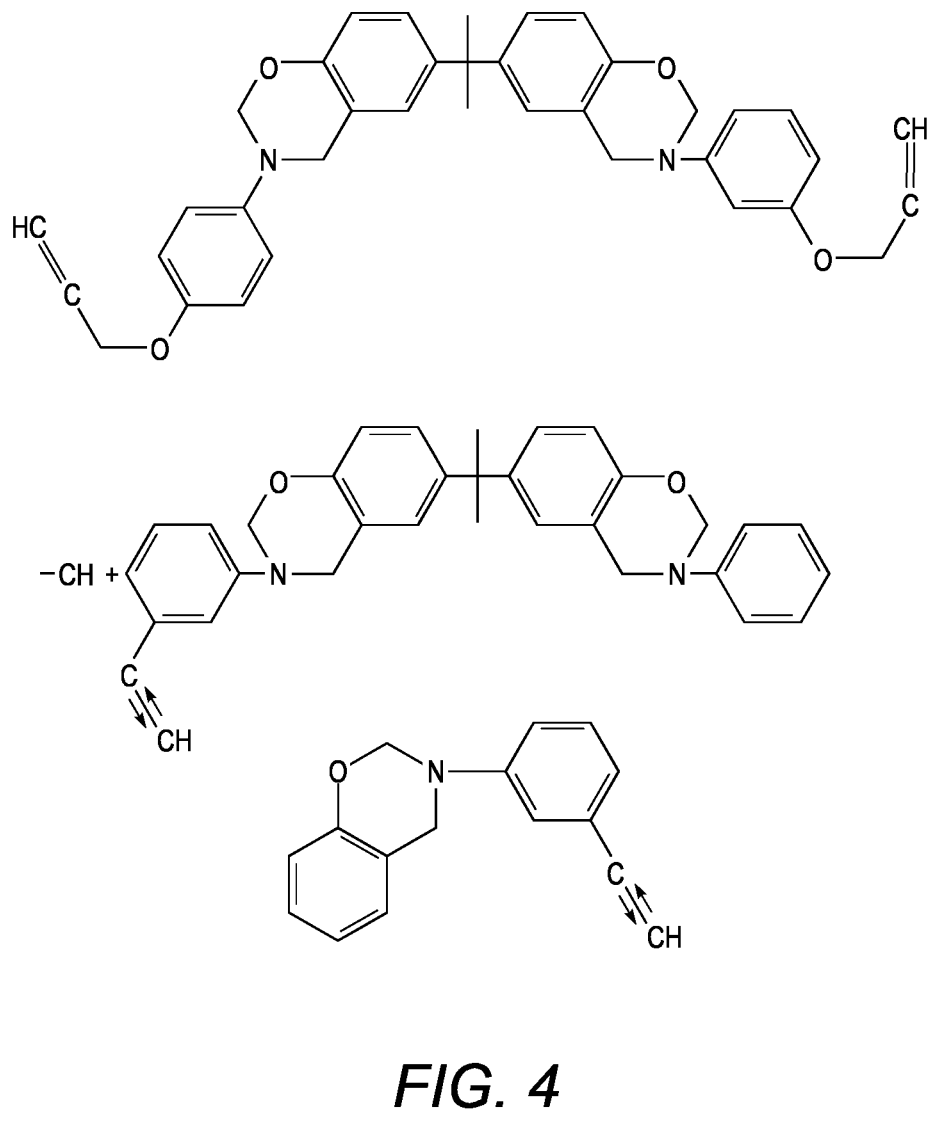

FIG. 4 shows various examples of acetylene-benzoxazines suitable for the embodiments here.

While the embodiments described in detail here involve specifics to SiC nanoparticles, the process can be extended to other particles and nanoparticles that contain hydroxyl groups (—OH) onto their surface. Example of other particles suitable for this process include: silica, clays, amorphous or crystalline carbon included carbon black, titania, magnesium oxide (MgO), graphene oxide (GO), silicon dioxide ($SiO_2$), aluminum oxide ($Al_2O_3$), ferrous oxide ($Fe_3O_4$), titanium dioxide ($TiO_2$), cesium dioxide ($CeO_2$), zinc oxide (ZnO), copper (III) oxide ($Cu_2O_3$), niobium oxide (NiO), cadmium oxide (CdO), silver dioxide ($Ag_2O$), molybdenum trioxide ($MoO_3$), tri-tungsten(VI) oxide ($WO_3$), tin(IV) oxide ($SnO_2$), cupric oxide (CuO), chromium oxide($Cr_2O_3$), indium oxide ($In_2O_3$), hydroxyapatite, boron nitride (BN), boron carbide ($BC_4$), and carbon nanotubes, among others. The particles may comprise metal oxides, or any particle that can be turned into a metal oxide by application of a treatment, such as thermal, electrical, plasma, and microwave. The particles may have any shape, including one-dimensional, two-dimensional, three-dimensional, and random shapes. The functionalized particles may be of any size, ranging from 1 nm to 5 mm.

The particle loading may occur in a range from 1 v % to 60 v %. For ceramic applications, higher content (40 v %-60 v %) has advantages because it increases the ceramic yield and reduces the voids.

In one embodiment, formulations with acetylene-benzoxazine-SiC particles in a benzoxazine resin are prepared by mixing them in a benzoxazine monomer, typically with high shear mixers. While in principle, the functionalized particles can be dispersed in any benzoxazine resin, of particular interest are those benzoxazine resins that can bond with the acetylene groups present onto the surface of the acetylene-benzoxazine-SiC particles. Suitable benzoxazines include acetylene-benzoxazines such as those shown in FIG. 4, because they can bond to the particles by coupling between the acetylene groups present onto particle and the acetylene group present in the benzoxazine resin, by radical polymerization. This embodiment is advantageous because it allows for radical polymerization of the acetylene groups to produce dense and mechanically strong SiC/benzoxazine composites upon curing. In addition, it may increase the high-temperature stability of the cured object made with these formulations. A radical initiator may be present in the formulation, such as a thermal radical initiator that initiates a radical polymerization by dissociation into radicals when heated. Suitable initiators include organic peroxides, AIBN (Azobisisobutyronitrile) and the like.

Figures 5, 6:
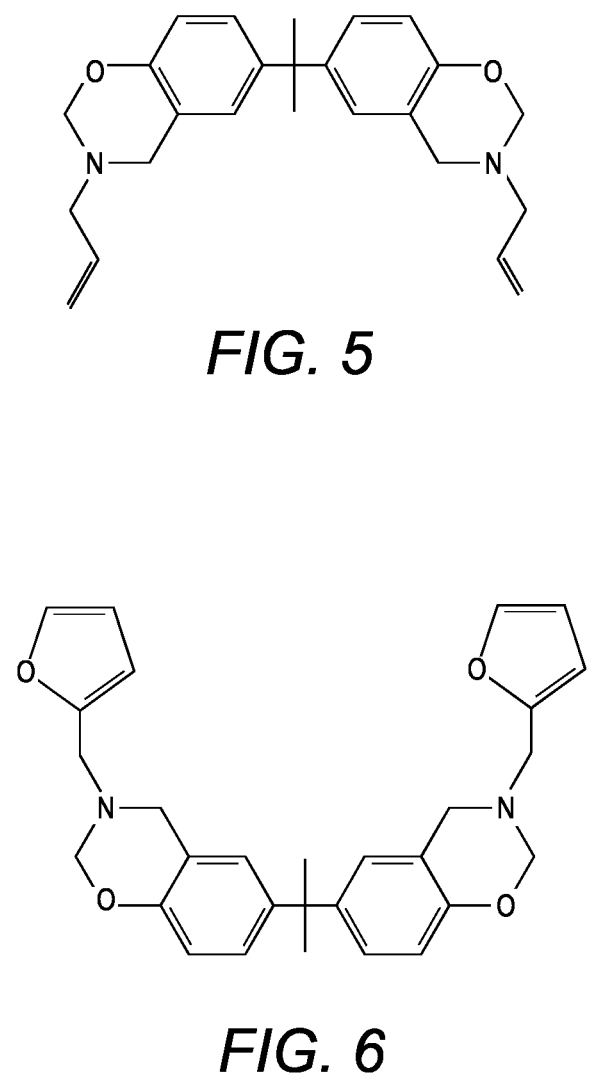

Other suitable benzoxazine with radical polymerizable groups include vinyl and allyl containing benzoxazines. FIG. 5 shows an example of such a group. Other suitable resin with functional groups that may react with the acetylene group present onto the surface of the acetylene-benzoxazine-SiC particles include furan-functionalized benzoxazines. FIG. 5 shows an example. Furan bonds to acetylene by Diels-Alder coupling reaction.

Curing of these formulations may include heating at a first temperature to promote radical initiation followed by heating at a second temperature to promote the curing of the benzoxazine. The first temperature may comprise a range from 40° C. to 150° C. The second temperature may comprise a range from 150° C. to about 300° C. Alternatively, if no radical initiator is present, the formulation is heated at a first temperature to promote benzoxazine polymerization followed by heating at an even higher temperature to promote acetylene polymerization. This may take place in the absence of a radical initiator at a temperature that is sufficiently higher. In this case, the first temperature may comprise a range from about 150° C. to 250° C. and the second temperature is higher than 250° C. The particle loading may comprise a range from 1 wt % to 60 wt %. For ceramic applications, higher content (40 wt %-60 wt %) increases the ceramic yield and reduces the voids.

In one embodiment, the formulations with acetylene-benzoxazine-SiC particles in a benzoxazine resin may create an object comprising the cured formulation. The object may have any shape and size. The object may be fabricated by injection molding followed by curing of the acetylene-benzoxazine-SiC particles in a benzoxazine resin. Fully cured structures can be achieved in minutes to hours. A higher curing temperature may decrease the curing time.

The object may also be fabricated by 3D printing using extrusion of the acetylene-benzoxazine-SiC particles in a benzoxazine resin formulation. The same extrusion process can be applied to formulations comprising the acetylene-benzoxazine-SiC particles dispersed in other curable benzoxazines, including vinyl, propargyl, and furan-functionalized benzoxazines. Other benzoxazines can be used for fabrication of extrudable formulations with acetylene-benzoxazine-SiC particles. In this case, it may be advantageous to have the formulation behave as a solid at the ambient temperature and as a liquid or a high viscosity paste at a higher temperature, such as 70° C. to 150° C. This facilitates extrusion through nozzles and to print an object that maintains shape upon printing, prior to curing. Curing in this case may take place by slowly heating the printed 3D object at temperature close to its melting temperature, for a longer time for partial curing, followed by cure completion at a higher temperature.

The object may also be fabricated by 3D printing through indirect powder bed sintering or direct powder bed sintering. In the indirect method, laser heats and cures the powder of resin formulation as mentioned before at 200° C.-300° C. range to form the structure by curing. Then the cured structure may be pyrolyzed to ceramic. In the direct method, the laser heats and pyrolyzes the resin at 700° C.-2500° C. to directly pyrolyze the matrix or pyrolyze and melt the matrix.

In another embodiment a ceramic object is fabricated. The process involved pyrolysis of the object fabricated with cured acetylene-benzoxazine-SiC particles in a benzoxazine resin. Pyrolysis is performed at a temperature comprising a range from 700° C. to 1000° C., under inert gas. The temperature is raised typically at a rate of 1-2°/min to limit shrinkage. Suitable inert gases include argon, nitrogen and the like. The crystallization of the ceramic precursor is performed by heating at a second temperature, higher than the pyrolyzing temperature, typically comprising a range from 1400° C. to 2200° C., but it may be as high as 3000° C. During crystallization process, the temperature is raised typically at a rate of 6-10° C./min.

In another embodiment, a ceramic matrix composite such as disclosed in U.S. Patent Application No. 63/170,454, is fabricated by pyrolyzing a carbon fiber reinforced polymer composites fabricated with a resin comprising the acetylene-benzoxazine-SiC particles in a benzoxazine resin, wherein the benzoxazine resin comprises a polymerizable group selected from acetylene, furan, propargyl and vinyl.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:

adding silicon carbide particles to an alkaline solution;

stirring the alkaline solution to cause the silicon carbide particles to acquire hydroxyl groups producing activated silicon carbide particles;

dispersing the activated silicon carbide particles into a solvent solution;

adding acetylene benzoxazine into the solvent solution;

mixing the solvent solution;

removing the solvent from the solvent solution to produce acetylene-benzoxazine functionalized particles;

drying the acetylene-benzoxazine functionalized silicon carbide particles; and mixing a mixture of the acetylene-benzoxazine functionalized silicon carbide particles with a benzoxazine monomer;

initiating polymerization of the benzoxazine monomer in the mixture to create a resin having the acetylene-benzoxazine functionalized silicon carbide particles dispersed within; and curing the resin; wherein the solvent is one or more selected from the group consisting of: dichloromethane, chloroform, 1,1-dichloroethane, 1,2-dichloroethane, trichloro ethane, tetrahydrofuran, dioxane, ethylene glycol ethers, dimethyl glycol ethers, ethyl glycol ethers, diethylene glycol, and triethylene glycol.

2. The method as claimed in claim 1, further comprising annealing the silicon carbide particles prior to adding the silicon carbide particles to the alkaline solution.

3. The method as claimed in claim 1, wherein stirring the solution further comprises washing the activated silicon carbide particles and drying the activated silicon carbide particles prior to dispersing the activated silicon carbide particles into the solvent solution.

4. The method as claimed in claim 1, wherein dispersing the activated silicon carbide particles into a solvent solution comprises dispersing the activated silicon carbide particles into the solvent solution with a catalyst.

5. The method as claimed in claim 4, wherein dispersing the activated silicon carbide particles into the solvent solution with the catalyst comprises dispersing the activated silicon carbide particles into the solvent solution with at least one Lewis acid as the catalyst.

6. The method as claimed in claim 5, wherein the Lewis acid comprises one or more of $FeCl_3$, $FeCl_3/AgSbF_6$, $FeF_3$, $FeBr_3$, $AlCl_3$, $BF_3$, $BBr_3$, $SnC_{14}$, $SnF_4$, $PF_5$, $PCl_5$, $ZnCl_2$, $BeCl_2$, $SiF_4$, $SiCl_4$, $SbCl_5$, $NbCl_5$, $FeCl_3x(H_2O)_6$, and $ZnCl_2xH_2O$.

7. The method as claimed in claim 1, wherein removing the solvent comprises separating the acetylene-benzoxazine functionalized silicon carbide particles by one of centrifugation or filtration, and washing the benzoxazine functionalized particles.

8. The method as claimed in claim 1, wherein initiating polymerization comprises adding a radical initiator to the mixture.

9. The method as claimed in claim 8, wherein initiating polymerization comprises heating the mixture to a first temperature, and curing the resin comprises heating the resin to a second temperature higher than the first temperature.

10. The method as claimed in claim 1, wherein initiating polymerization comprises heating the mixture to a first temperature sufficient to promote benzoxazine polymerization and then heating the mixture to a second temperature sufficient to promote acetylene polymerization.

11. The method as claimed in claim 1, further comprising forming an object from the resin prior to curing.

12. The method as claimed in claim 11, further comprising pyrolizing the object to produce a ceramic object.

13. The method as claimed in claim 11, wherein forming the object comprises three-dimensional printing the mixture.

14. The method as claimed in claim 13, wherein three-dimensional printing comprises one of extrusion, indirect powder bed sintering, or direct powder bed sintering.

15. The method as claimed in claim 1, wherein the benzoxazine monomer comprises one of acetylene-benzoxazines, vinyl benzoxazines, allyl benzoxazines, propargyl benzoxazines, and furan-functionalized benzoxazines.

* * * * *